United States Patent [19]
Caratsch

[11] 3,814,052
[45] June 4, 1974

[54] APPARATUS FOR APPLYING A THERMOPLASTIC MATERIAL IN THE FORM OF MUTUALLY ISOLATED DEPOSITS TO A SURFACE STRUCTURE

[76] Inventor: Hans-Peter Caratsch, Itenhard 16, 5620 Bremgarten/AG, Switzerland

[22] Filed: May 8, 1972

[21] Appl. No.: 251,027

[30] Foreign Application Priority Data
May 10, 1971 Switzerland.................. 6842/71

[52] U.S. Cl................................ 118/60, 118/212
[51] Int. Cl............................................ B05c 1/04
[58] Field of Search........................... 118/60, 212

[56] References Cited
UNITED STATES PATENTS

| | | |
|---|---|---|
| 2,787,244 | 4/1957 | Hickin .................. 118/212 X |
| 3,349,749 | 10/1967 | Utschig .................. 118/212 X |
| 3,762,365 | 10/1973 | Herzog .................. 118/212 |

Primary Examiner—Louis K. Rimrodt
Attorney, Agent, or Firm—Werner W. Kleeman

[57] ABSTRACT

An apparatus for applying a thermoplastic material in the form of deposits which are spaced from one another to a surface structure by means of a roller rolling upon the surface structure and provided at its outer surface with recesses formed in accordance with the configuration, size and distribution of the deposits. A doctor element cooperating with the roller forms therewith a gap, and there is also provided means for infeeding the thermoplastic material into the gap in the form of a foil which is in a plasticized condition.

10 Claims, 1 Drawing Figure

PATENTED JUN 4 1974
3,814,052
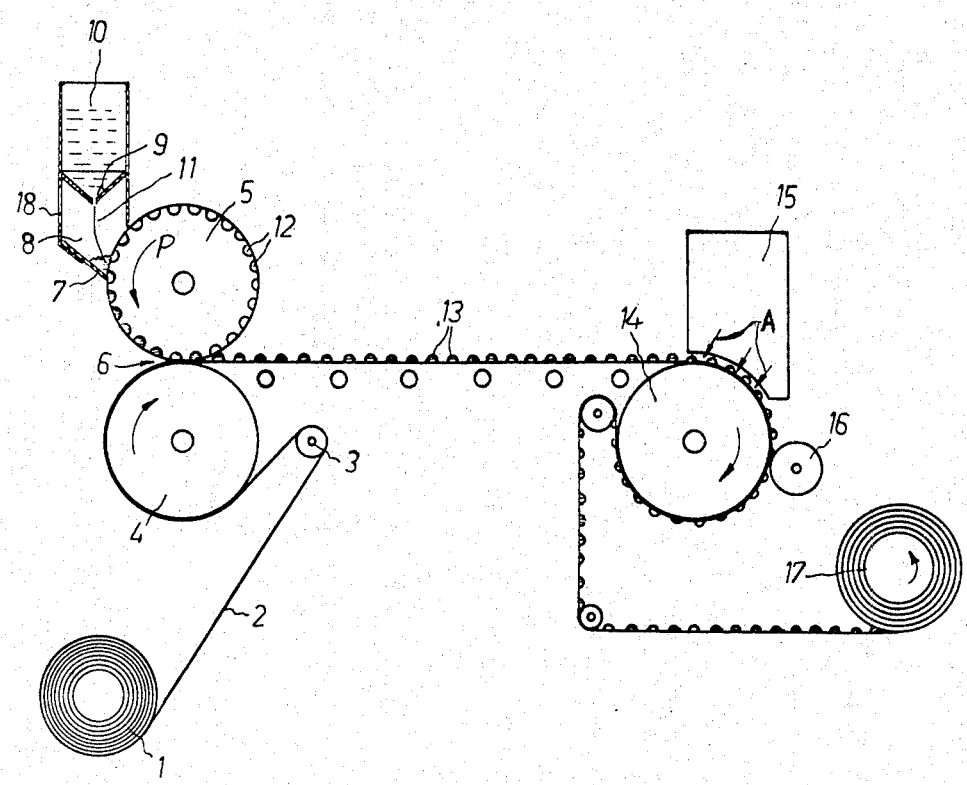

APPARATUS FOR APPLYING A THERMOPLASTIC MATERIAL IN THE FORM OF MUTUALLY ISOLATED DEPOSITS TO A SURFACE STRUCTURE

BACKGROUND OF THE INVENTION

The present invention relates to a new and improved apparatus for the application of a thermoplastic synthetic material or plastic in the form of deposits which are isolated or spaced from one another to a surface structure by means of a roller intended to roll upon the surface structure and provided at its surface with recesses formed in accordance with the configuration, size and distribution of the deposits.

For the application of a plastic, which need not necessarily be a thermoplastic plastic, to a surface structure in a form of depositions or deposits which are isolated from one another, for instance to web material, typically textile webs, there is already known to the art an apparatus in which the plastic is accommodated internally of a sieve roll which rolls upon the surface structure and this plastic is expressed via the roller perforations onto the surface structure. The operations which occur with this type prior art equipment can be compared with those prevailing during screen printing techniques.

According to a different state-of-the-art construction of the previously mentioned general type the thermoplastic plastic or material is deposited in powder form from a funnel-shaped container arranged above the roller into the recesses at the outer surface of such roller. The powder material is then transported to the surface structure and deposited thereon. In this arrangement the greatest care is employed to ensure that the structured roller is maintained at such a low temperature that the powder material does not plasticize during transport and retains its loose formation, so that there is prevented adherence or bonding of the plastic material at the recesses and difficulties in transferring the plastic to the surface structure which, as the case may be, can be associated with a so-called "thread-drawing" phenomenon. The actual plastification of the plastic material only takes place following its transfer to the surface structure by using external heating, for instance an infrared heating device, during a longer heating and plastification period. The limitations in productivity associated therewith can be compensated to a certain degree when processing continuous web materials, yet extreme space requirements must be satisfied. In fact the length of such equipment is in the order of magnitude of about 40 meters. But even with such length of the heating path the feed velocity of the web material is subject to certain limits in order that the requisite time is available for the complete plastification of the material and for its anchoring to the support surface or substrate. In order to realize a better result the web material is oftentimes heated prior to delivery to the structured roller; yet a decisive improvement is not realized notwithstanding such additional expenditure.

SUMMARY OF THE INVENTION

Therefore, from what has been explained above it will be apparent that this particular field of technology is still in need of improved equipment for applying a thermoplastic plastic or synthetic material to a surface structure which is not associated with the aforementioned drawbacks and limitations of the state-of-the art constructions. Hence it is a primary object of the present invention to provide apparatus of the aforementioned type which effectively and reliably fulfills the existing need in the art.

Still a further significant object of the present invention relates to an improved apparatus for the deposition of thermoplastic materials onto a surface structure in the form of isolated or spaced deposits in a manner devoid of the drawbacks associated with the heretofore discussed prior art proposals.

Now in order to implement these and still further objects of the invention, which will become more readily apparent as the description proceeds, the inventive apparatus is manifested by the features that the roller together with a doctor element cooperating therewith forms a gap, and there is provided means for delivering the plastic in the form of a foil which is in a plasticized condition to the gap.

Owing to the fact that the structured roller receives the plastic in the form of a foil which is in a plasticized condition, transports such foil and transfers it to the surface structure, there are already present during the transfer operation those conditions which can be only realized with the prior art equipment following a heating or plastification period and which prevail at the end of a path of about forty meters length. As a result productivity is exceptionally increased so that especially when processing continuous web materials the feed velocity thereof is practically not subjected to any limits. At the same time the length of the installation can be reduced by a factor of ten. Considered from the viewpoint of those skilled in the art these enormous advantages were not to be expected, firstly because the skilled artisan had to be surprised that such apparatus would even function. In reality the previously discussed state-of-the-art clearly demonstrates that those skilled in the art considered that the transport of plasticized material had to be associated with the adhesive bonding thereof in the recesses of the roller and the drawing of threads as previously explained.

BRIEF DESCRIPTION OF THE DRAWINGS

The invention will be better understood and objects other than those set forth above, will become apparent when consideration is given to the following detailed description thereof. Such description makes reference to the annexed drawing wherein the single FIGURE schematically illustrates an exemplary embodiment of inventive apparatus for processing continuous web materials.

DETAILED DESCRIPTION OF THE PREFERRED EMBODIMENTS

Describing now the drawing, it is to be understood that web material 2 paid-off or withdrawn from a supply roll 1 travels about a deflecting roll 3 to a cooled counter roller 4. The counter roller 4 together with a structured roller 5 forms a roller gap 6 for throughpassage of the web material 2. The counter roller 4 is preferably cooled in order to deliver the web material trained about this roller at a suitably reduced temperature to the roller gap 6.

The structured roll or roller 5 together with a doctor element 7 or equivalent device forms a gap or space 8 which confronts a flat or wide-mouth nozzle 9 of an extruder 10. The plastic material departing from the flat nozzle 9 in the form of a foil 11 which is in a plasticized condition arrives, with the illustrated arrangement, directly at the gap 8 and forms at that location between the doctor element 7 and the outer surface of the roller 5 provided with recesses 12 a slightly excess supply quantity which distributes throughout the complete length of the roll, and which with the assumed rotational movement of the roller as indicated by the arrow P is continuously pressed by means of the doctor element 7 into the recesses 12. The recesses 12 at the roller surface advantageously correspond in shape, size and distribution to the deposited material or deposits. In these recesses of the preferably heated roller 5 the plasticized plastic is transported to the roller gap 6 and there deposited upon the web material 2 defining the surface structure. As soon as the plastic material comes into contact with the (colder) web material 2 it becomes tacky so that a corresponding increase in the adhesion at the region of contact remains limited and release from the roller 5 can occur without difficulty and in particular without drawing-off threads.

Immediately after departure from the roller gap 6 the web material 2, now provided with the plastic deposits or depositions 13, arrives via a roller 14 at the region of a cooling compartment 15 at which, as indicated by the arrows A, cool air is blown against the web material. A calender or calender roll 16 follows the web material in its feed direction. Finally, the web material is again rolled up at location 17 in any suitable fashion.

During operation of the apparatus it should be readily apparent that owing to the infeed of the plastic or synthetic material in the form of a foil only a relatively small quantity of plasticized plastic material is located at the gap, in order to avoid changes in the material, for instance by oxidation. It is preferable to arrange forwardly of the gap a screening or covering mechanism 18 within which there is formed an atmosphere of a protective gas. The temperature of the roller 5 is to be selected such that the plastic during its transfer to the web material does not in any case become subjected to any cooling or any appreciable cooling. As previously stated by carrying out these measures there is avoided the danger of drawing threads.

It should be understood that instead of using the extruder 10 with the flat or wide-mouth nozzle other means could be employed which are capable of delivering the plastic in the form of a foil which is in a plasticized condition. For instance it would be possible to draw a foil from its supply to the delivery gap and while it is "underway," that is prior to reaching the delivery gap, to plasticize such by appropriate heating means. Conceptually, then, unit 10 might be considered a foil supply roll and unit 18 a suitable heater mechanism. The previously discussed advantages are also afforded without limitation in this case.

As far as realizing a further improvement in equipment expenditure and in contrast to the previously mentioned prior art devices it should be indicated that there are avoided the costs associated with grinding which is required in the prior art equipment due to transformation of the plastic invariably delivered in the form of a granulate into powder form.

While there is shown and described present preferred embodiments of the invention, it is to be distinctly understood that the invention is not limited thereto but may be otherwise variously embodied and practiced within the scope of the following claims. Accordingly,

What is claimed is:

1. An apparatus for applying a thermoplastic plastic material in the form of deposits which are in spaced relationship from one another to a surface structure, comprising a roller rolling upon the surface structure and provided at its surface with recesses which correspond in shape, size and distribution to the deposits, a doctor element cooperating with the roller and forming a gap therewith, and means for delivering the plastic material in the form of a foil in a plasticized condition to the gap.

2. The apparatus as defined in claim 1, wherein said delivering means comprise an extruder having a wide-mouth nozzle confronting the gap.

3. The apparatus as defined in claim 2, wherein said roller constitututes a heated roll, a cooled counter roller forming together with the heated roll a roller gap for the throughpassage of the surface structure.

4. The apparatus as defined in claim 2, further including means for providing a protective gas atmosphere at the region of said gap.

5. The apparatus as defined in claim 1, further including feed means for delivering thermoplastic foil material to the gap, and a heating mechanism arranged in the direction of feed of the foil material.

6. The apparatus as defined in claim 5, wherein said roller constitutes a heated roll, a cooled counter roller cooperating with the heated roll to form a roller gap for the throughpassage of the surface structure.

7. The apparatus as defined in claim 5, further including means for providing a protective gas atmosphere at the region of the gap.

8. The apparatus as defined in claim 1, wherein said roller constitutes a heated roll, a cooler counter roller cooperating with the heated roll and forming therewith a roller gap means for the throughpassage of the surface structure, and means for providing a protective gas atmosphere at the region of the gap.

9. An apparatus for applying a thermoplastic plastic material in the form of deposits which are in spaced relationship from one another to a surface structure, comprising roller means rolling upon the surface structure, said roller means being provided at its surface with recesses, an element cooperating with said roller means and forming therewith a gap, and means for delivering a supply of the plastic material in the form of a foil in a plasticized condition to said gap and which supply is present in an amount not excessively greater than the amount of plastic material to be transferred at any given instant of time from the gap to the roller.

10. An apparatus for applying a thermoplastic plastic material in the form of deposits which are in spaced relationship from one another to a surface structure, comprising a roller rolling upon the surface structure and provided at its surface with recesses which correspond in shape, size and distribution to the deposits, a doctor element cooperating with the roller and forming a gap therewith, and means for progressively continuously delivering a supply of plastic material in a plasticized condition to the gap and which supply is present in an amount not appreciably exceeding the amount of plastic material to be transferred at any given moment from the gap to the roller in order to substantially avoid undesirable changes in the plastic material.

* * * * *